United States Patent
Kimura et al.

(10) Patent No.: US 8,006,790 B2
(45) Date of Patent: Aug. 30, 2011

(54) VEHICLE AND CONTROL METHOD THEREOF, POWER OUTPUT APPARATUS AND CONTROL METHOD THEREOF, AND DRIVING SYSTEM AND CONTROL METHOD THEREOF

(75) Inventors: Akihiro Kimura, Toyota (JP); Kiyoshiro Ueoka, Nisshin (JP); Yoichi Tajima, Anjo (JP); Takeshi Aoki, Nishio (JP)

(73) Assignees: Toyota Jidosha Kabushiki Kaisha, Aichi-ken (JP); Aisin Aw Co., Ltd., Aichi-ken (JP)

( * ) Notice: Subject to any disclaimer, the term of this patent is extended or adjusted under 35 U.S.C. 154(b) by 325 days.

(21) Appl. No.: 12/026,706

(22) Filed: Feb. 6, 2008

(65) Prior Publication Data

US 2008/0185199 A1 Aug. 7, 2008

(30) Foreign Application Priority Data

Feb. 7, 2007 (JP) ................................. 2007-028349

(51) Int. Cl.
*B60K 6/36* (2007.10)
(52) U.S. Cl. ........................... 180/65.6; 903/945; 701/70
(58) Field of Classification Search ............ 180/65.275, 180/65.28, 65.6, 65.7; 903/909, 915, 916, 903/917, 945; 701/22, 36, 70
See application file for complete search history.

(56) References Cited

U.S. PATENT DOCUMENTS

| | | | |
|---|---|---|---|
| 5,301,769 A * | 4/1994 | Weiss ............................ | 180/249 |
| 6,719,379 B2 * | 4/2004 | Crombrez ..................... | 303/152 |
| 7,409,280 B2 * | 8/2008 | Nakamura et al. ............. | 701/70 |
| 7,441,845 B2 * | 10/2008 | Crombez et al. ............. | 303/152 |

FOREIGN PATENT DOCUMENTS

| | | |
|---|---|---|
| JP | 2003-32802 A | 1/2003 |
| JP | 2006-187158 A | 7/2006 |

* cited by examiner

*Primary Examiner* — John D Walters
(74) *Attorney, Agent, or Firm* — Sughrue Mion, PLLC

(57) ABSTRACT

In response to a driver's braking request operation, for example, the driver's depression of a brake pedal 85, a hybrid vehicle 20 sets a fraction of a regenerative braking torque by a motor MG2 and a fraction of a braking torque by a brake unit 90 relative to a preset braking torque demand Tr* according to the setting of a speed change ratio in a transmission 60 (steps S280, S290, S310, S320, S390, and S400). The hybrid vehicle 20 controls the motor MG2 to output the regenerative braking torque based on the preset braking torque demand Tr* and the set fraction of the regenerative braking torque, while controlling the brake unit 90 to enable the braking torque based on the preset braking force demand Tr* and the regenerative braking torque by the motor MG2 to be applied in a distributive manner at a preset front-rear braking torque distribution ratio 'd' to front wheels 39a and 39b and to rear wheels 39c and 39d.

12 Claims, 6 Drawing Sheets

VEHICLE AND CONTROL METHOD THEREOF, POWER OUTPUT APPARATUS AND CONTROL METHOD THEREOF, AND DRIVING SYSTEM AND CONTROL METHOD THEREOF

BACKGROUND OF THE INVENTION

1. Field of the Invention

The present invention relates to a vehicle driven with powers respectively output to front wheels and to rear wheels, a power output apparatus and a driving system mounted on such a vehicle, and control methods of the vehicle, the power output apparatus, and the driving system.

2. Description of the Prior Art

One known structure of a power output apparatus for a hybrid vehicle equipped with a hydraulic brake unit includes a driveshaft, an engine linked with the driveshaft via a planetary gear mechanism, a generator connected to the planetary gear mechanism, and a motor linked with the driveshaft via a transmission (see, for example, Japanese Patent Laid-Open No. 2006-187158). In the case of a change of a speed change state in the transmission from a Hi gear position to a Lo gear position under regenerative control of the motor for braking the vehicle, this power output apparatus sets a torque command of the motor to gradually decrease a regenerative braking force to zero and compensates for a resulting decrease in total braking force with a braking force applied by the hydraulic brake unit. This aims to prevent a torque shock (variation in total braking force) caused by a speed change in the transmission.

The power output apparatus of this known structure is not restricted to front-wheel drive vehicles or rear-wheel drive vehicles but is also applicable to four-wheel drive vehicles by distributing the power output to the driveshaft into front wheels and rear wheels. The cited reference, however, does not disclose braking control in the case of a change of the speed change state of the transmission under regenerative control of the motor in a four-wheel drive vehicle equipped with such a power output apparatus.

SUMMARY OF THE INVENTION

There would be a demand for optimizing braking control in a vehicle that is driven with powers respectively output to front wheels and to rear wheels and is equipped with a motor enabling output of a regenerative braking force to a speed change transmission structure. It would also be desirable to optimize the braking control in a change of a speed change state of the speed change transmission structure under regenerative control of the motor in such a vehicle.

The present invention accomplishes the demands mentioned above by the following configurations applied to the vehicle and the control method of the vehicle, the power output apparatus and the control method of the power output apparatus, and the driving system and the control method of the driving system.

One aspect of the invention pertains to a vehicle that is driven with powers respectively output to front wheels and rear wheels. The vehicle includes: a first shaft that is linked with the front wheels; a second shaft that is linked with the rear wheels; an internal combustion engine that outputs power to a preset driveshaft; a power distribution transfer structure that transfers power output to the driveshaft in a distributive manner to the first shaft and to the second shaft; a motor that outputs at least a regenerative braking force to an output shaft of the motor, which is one of the driveshaft, the first shaft, and the second shaft; an accumulator unit that transmits electric power to and from the motor; a speed change transmission structure that enables transmission of power between a rotating shaft of the motor and the output shaft of the motor with a change of a speed change ratio; a braking mechanism that enables independent application of a braking force to the front wheels and to the rear wheels, irrespective of a driver's braking request operation; a braking force demand setting module that sets a braking force demand required by the driver's braking request operation; a braking fraction setting module that sets a fraction of the regenerative braking force by the motor and a fraction of the braking force by the braking mechanism relative to the set braking force demand according to a setting of the speed change ratio in the speed change transmission structure, in response to the driver's braking request operation; and a braking controller that controls the motor to output the regenerative braking force based on the set braking force demand and the set fraction of the regenerative braking force, while controlling the braking mechanism to enable the braking force based on the set braking force demand and the regenerative braking force by the motor to be applied in a distributive manner at a preset front-rear distribution ratio to the front wheels and to the rear wheels.

The vehicle according to one aspect of the invention is equipped with the motor that outputs at least the regenerative braking force via the speed change transmission structure to the output shaft of the motor, which is one of the driveshaft, the first shaft, and the second shaft, and with the braking mechanism that enables independent application of the braking force to the front wheels and to the rear wheels, irrespective of the driver's braking request operation. The vehicle is driven with the powers respectively output to the front wheels and to the rear wheels by distributing at least the power output to the driveshaft by the internal combustion engine to the first shaft and the second shaft by means of the power distribution transfer structure. In response to the driver's braking request operation, the vehicle sets the fraction of the regenerative braking force by the motor and the fraction of the braking force by the braking mechanism relative to the set braking force demand according to the setting of the speed change ratio in the speed change transmission structure. The vehicle controls the motor to output the regenerative braking force based on the set braking force demand and the set fraction of the regenerative braking force, while controlling the braking mechanism to enable the braking force based on the set braking force demand and the regenerative braking force by the motor to be applied in a distributive manner at the preset front-rear distribution ratio to the front wheels and to the rear wheels. Setting the fraction of the regenerative braking force by the motor and the fraction of the braking force by the braking mechanism relative to the set braking force demand according to the setting of the speed change ratio in the speed change transmission structure effectively reduces a variation in braking force before and after a change of the speed change ratio in the speed change transmission structure even during braking of the vehicle and ensures a smooth change of the speed change ratio. The braking force based on the set braking force demand and the regenerative braking force by the motor is applied in a distributive manner at the preset front-rear distribution ratio to the front wheels and to the rear wheels. This desirably reduces a variation in distribution of the braking force between the front wheels and the rear wheels before and after the change of the speed change ratio and ensures the good braking performance. The technique of the invention effectively optimizes the braking control in the vehicle that is driven with the powers respectively output to the front wheels and to the rear wheels and is equipped with the motor enabling output of the regenerative braking force to the speed change transmission structure.

In one preferable application of the vehicle according to one aspect of the invention, the front-rear distribution ratio is a fixed value. This arrangement ensures the good braking performance without complicating the braking control operation. In the vehicle of this application, the power distribution transfer structure may transfer the power output to the driveshaft in a distributive manner at a distribution ratio equal to the front-rear distribution ratio to the first shaft and to the second shaft.

In another preferable application of the vehicle, the braking fraction setting module sets the fraction of the regenerative braking force by the motor and the fraction of the braking force by the braking mechanism to attain a gradual decrease of the regenerative braking force by the motor, simultaneously with a gradual increase of the braking force by the braking mechanism in expectation of a change of the speed change ratio in the speed change transmission structure. During output of the regenerative braking force by the motor in response to the driver's braking request operation, a maximum possible portion of the regenerative braking force is replaced with the braking force by the braking mechanism before an actual change of the speed change ratio in the speed change transmission structure. Such control desirably reduces a variation in braking force (torque shock) caused by the actual change of the speed change ratio in the speed change transmission structure. In the vehicle of this application, the braking fraction setting module may set the fraction of the regenerative braking force relative to the set braking force demand to zero during the change of the speed change rate in the speed change transmission structure. This enables further reduction of the variation in braking force (torque shock) caused by the change of the speed change ratio in the speed change transmission structure.

In still another preferable application of the vehicle, the braking fraction setting module sets a smaller value to the fraction of the regenerative braking force relative to the set braking force demand at a lower speed change rate in the speed change transmission structure. During braking of the vehicle, there is a high tendency of a change of the speed change ratio from a lower value to a higher value (deceleration) in the speed change transmission structure. Setting the smaller fraction of the regenerative braking force relative to the set braking force demand at the lower speed change rate in the speed change transmission structure effectively reduces a variation in braking force before and after replacement of the regenerative braking force with the braking force by the braking mechanism and ensures a smooth change of the speed change ratio in the speed change transmission structure.

In one preferable embodiment, the vehicle further includes an electric power mechanical power input output assembly that is connected to the driveshaft and a shaft of the internal combustion engine to enable transmission of at least part of the output power of the internal combustion engine to the driveshaft and transmission of electric power to and from the accumulator unit through input and output of electric power and mechanical power. In one preferable structure of the vehicle of this embodiment, the electric power mechanical power input output assembly has: a motor for power generation that enables input and output of power; and a three shaft-type power input output structure that is linked to three shafts, the driveshaft, the shaft of the internal combustion engine, and a rotating shaft of the motor for power generation, and inputs and outputs power from and to a residual one shaft based on powers input from and output to any two shafts among the three shafts.

According to another aspect, the invention is directed to a control method of a vehicle, which is equipped with a first shaft that is linked with front wheels; a second shaft that is linked with rear wheels; an internal combustion engine that outputs power to a preset driveshaft; a power distribution transfer structure that transfers power output to the driveshaft in a distributive manner to the first shaft and to the second shaft; a motor that outputs at least a regenerative braking force to an output shaft of the motor, which is one of the driveshaft, the first shaft, and the second shaft; an accumulator unit that transmits electric power to and from the motor; a speed change transmission structure that enables transmission of power between a rotating shaft of the motor and the output shaft of the motor with a change of a speed change ratio; and a braking mechanism that enables independent application of a braking force to the front wheels and to the rear wheels, irrespective of a driver's braking request operation. The control method of the vehicle includes the steps of: (a) setting a braking force demand required by the driver's braking request operation; (b) setting a fraction of the regenerative braking force by the motor and a fraction of the braking force by the braking mechanism relative to the braking force demand set in the step (a) according to a setting of the speed change ratio in the speed change transmission structure; and (c) controlling the motor to output the regenerative braking force based on the braking force demand set in the step (a) and the fraction of the regenerative braking force set in the step (b), while controlling the braking mechanism to enable the braking force based on the braking force demand set in the step (a) and the regenerative braking force by the motor to be applied in a distributive manner at a preset front-rear distribution ratio to the front wheels and to the rear wheels.

Setting the fraction of the regenerative braking force by the motor and the fraction of the braking force by the braking mechanism relative to the set braking force demand according to the setting of the speed change ratio in the speed change transmission structure effectively reduces a variation in braking force before and after a change of the speed change ratio in the speed change transmission structure even during braking of the vehicle and ensures a smooth change of the speed change ratio. The braking force based on the set braking force demand and the regenerative braking force by the motor is applied in a distributive manner at the preset front-rear distribution ratio to the front wheels and to the rear wheels. This desirably reduces a variation in distribution of the braking force between the front wheels and the rear wheels before and after the change of the speed change ratio and ensures the good braking performance. The control method according to this aspect of the invention effectively optimizes the braking control in the vehicle that is driven with the powers respectively output to the front wheels and to the rear wheels and is equipped with the motor enabling output of the regenerative braking force to the speed change transmission structure.

In one preferable embodiment of the control method of the vehicle, the power distribution transfer structure transfers the power output to the driveshaft in a distributive manner at a distribution ratio equal to the front-rear distribution ratio to the first shaft and to the second shaft, and the step (c) controls the braking mechanism to enable application of the braking force at a fixed value of the front-rear distribution ratio to the front wheels and to the rear wheels.

In another preferable embodiment of the control method of the vehicle, the step (b) sets the fraction of the regenerative braking force by the motor and the fraction of the braking force by the braking mechanism to attain a gradual decrease of the regenerative braking force by the motor, simultaneously with a gradual increase of the braking force by the braking mechanism in expectation of a change of the speed change ratio in the speed change transmission structure. In the control method of this embodiment, the step (b) sets the fraction of the regenerative braking force relative to the set braking force demand to zero during the change of the speed change rate in the speed change transmission structure.

In still another preferable embodiment of the control method of the vehicle, the step (b) sets a smaller value to the fraction of the regenerative braking force relative to the set braking force demand at a lower speed change rate in the speed change transmission structure.

According to still another aspect, the invention is directed to a power output apparatus mounted on a vehicle, which is equipped with a braking mechanism that enables independent application of a braking force to front wheels and to rear wheels irrespective of a driver's braking request operation. The power output apparatus includes: a first shaft that is linked with the front wheels; a second shaft that is linked with the rear wheels; an internal combustion engine that outputs power to a preset driveshaft; a power distribution transfer structure that transfers power output to the driveshaft in a distributive manner to the first shaft and to the second shaft; a motor that outputs at least a regenerative braking force to the driveshaft; an accumulator unit that transmits electric power to and from the motor; a speed change transmission structure that enables transmission of power between a rotating shaft of the motor and the driveshaft with a change of a speed change ratio; a braking force demand setting module that sets a braking force demand required by the driver's braking request operation; a braking fraction setting module that sets a fraction of the regenerative braking force by the motor and a fraction of the braking force by the braking mechanism relative to the set braking force demand according to a setting of the speed change ratio in the speed change transmission structure, in response to the driver's braking request operation; and a braking controller that controls the motor to output the regenerative braking force based on the set braking force demand and the set fraction of the regenerative braking force, while controlling the braking mechanism to enable the braking force based on the set braking force demand and the regenerative braking force by the motor to be applied in a distributive manner at a preset front-rear distribution ratio to the front wheels and to the rear wheels.

The present invention is also directed to a control method of a power output apparatus. The power output apparatus includes: a first shaft; a second shaft; an internal combustion engine that outputs power to a preset driveshaft; a power distribution transfer structure that transfers power output to the driveshaft in a distributive manner to the first shaft and to the second shaft; a motor that outputs at least a regenerative braking force to the driveshaft; an accumulator unit that transmits electric power to and from the motor; and a speed change transmission structure that enables transmission of power between a rotating shaft of the motor and the driveshaft with a change of a speed change ratio, where the power output apparatus is mounted on a vehicle, which is equipped with a braking mechanism that enables independent application of a braking force to front wheels linked with the first shaft and to rear wheels linked with the second shaft irrespective of a driver's braking request operation. The control method of the power output apparatus includes the steps of: (a) setting a braking force demand required by the driver's braking request operation; (b) setting a fraction of the regenerative braking force by the motor and a fraction of the braking force by the braking mechanism relative to the braking force demand set in the step (a) according to a setting of the speed change ratio in the speed change transmission structure; and (c) controlling the motor to output the regenerative braking force based on the braking force demand set in the step (a) and the fraction of the regenerative braking force set in the step (b), while controlling the braking mechanism to enable the braking force based on the braking force demand set in the step (a) and the regenerative braking force by the motor to be applied in a distributive manner at a preset front-rear distribution ratio to the front wheels and to the rear wheels.

According to still another aspect, the invention is directed to a driving system that is mounted on a vehicle, which is equipped with an internal combustion engine, an accumulator unit, and a braking mechanism that enables independent application of a braking force to front wheels and to rear wheels irrespective of a driver's braking request operation. The driving system includes: a driveshaft that is connected to the internal combustion engine; a first shaft that is linked with the front wheels; a second shaft that is linked with the rear wheels; a power distribution transfer structure that transfers power output to the driveshaft in a distributive manner to the first shaft and to the second shaft; a motor that enables transmission of electric power to and from the accumulator unit and outputs at least a regenerative braking force to the driveshaft; a speed change transmission structure that enables transmission of power between a rotating shaft of the motor and the driveshaft with a change of a speed change ratio; a braking force demand setting module that sets a braking force demand required by the driver's braking request operation; a braking fraction setting module that sets a fraction of the regenerative braking force by the motor and a fraction of the braking force by the braking mechanism relative to the set braking force demand according to a setting of the speed change ratio in the speed change transmission structure, in response to the driver's braking request operation; and a braking controller that controls the motor to output the regenerative braking force based on the set braking force demand and the set fraction of the regenerative braking force, while controlling the braking mechanism to enable the braking force based on the set braking force demand and the regenerative braking force by the motor to be applied in a distributive manner at a preset front-rear distribution ratio to the front wheels and to the rear wheels.

The present invention is also directed to a control method of a driving system mounted on a vehicle, which is equipped with an internal combustion engine, an accumulator unit, and a braking mechanism that enables independent application of a braking force to front wheels and to rear wheels irrespective of a driver's braking request operation. The driving system includes: a driveshaft that is connected to the internal combustion engine; a first shaft that is linked with the front wheels; a second shaft that is linked with the rear wheels; a power distribution transfer structure that transfers power output to the driveshaft in a distributive manner to the first shaft and to the second shaft; a motor that enables transmission of electric power to and from the accumulator unit and outputs at least a regenerative braking force to the driveshaft; and a speed change transmission structure that enables transmission of power between a rotating shaft of the motor and the driveshaft with a change of a speed change ratio. The control method of the driving system includes the steps of: (a) setting a braking force demand required by the driver's braking request operation; (b) setting a fraction of the regenerative braking force by the motor and a fraction of the braking force by the braking mechanism relative to the braking force demand set in the step (a) according to a setting of the speed change ratio in the speed change transmission structure; and (c) controlling the motor to output the regenerative braking force based on the braking force demand set in the step (a) and the fraction of the regenerative braking force set in the step (b), while controlling the braking mechanism to enable the braking force based on the braking force demand set in the step (a) and the regenerative braking force by the motor to be applied in a distributive manner at a preset front-rear distribution ratio to the front wheels and to the rear wheels.

DESCRIPTION OF THE PREFERRED EMBODIMENTS

One mode of carrying out the invention is described below as a preferred embodiment with reference to the accompanied drawings.

Figure 1:
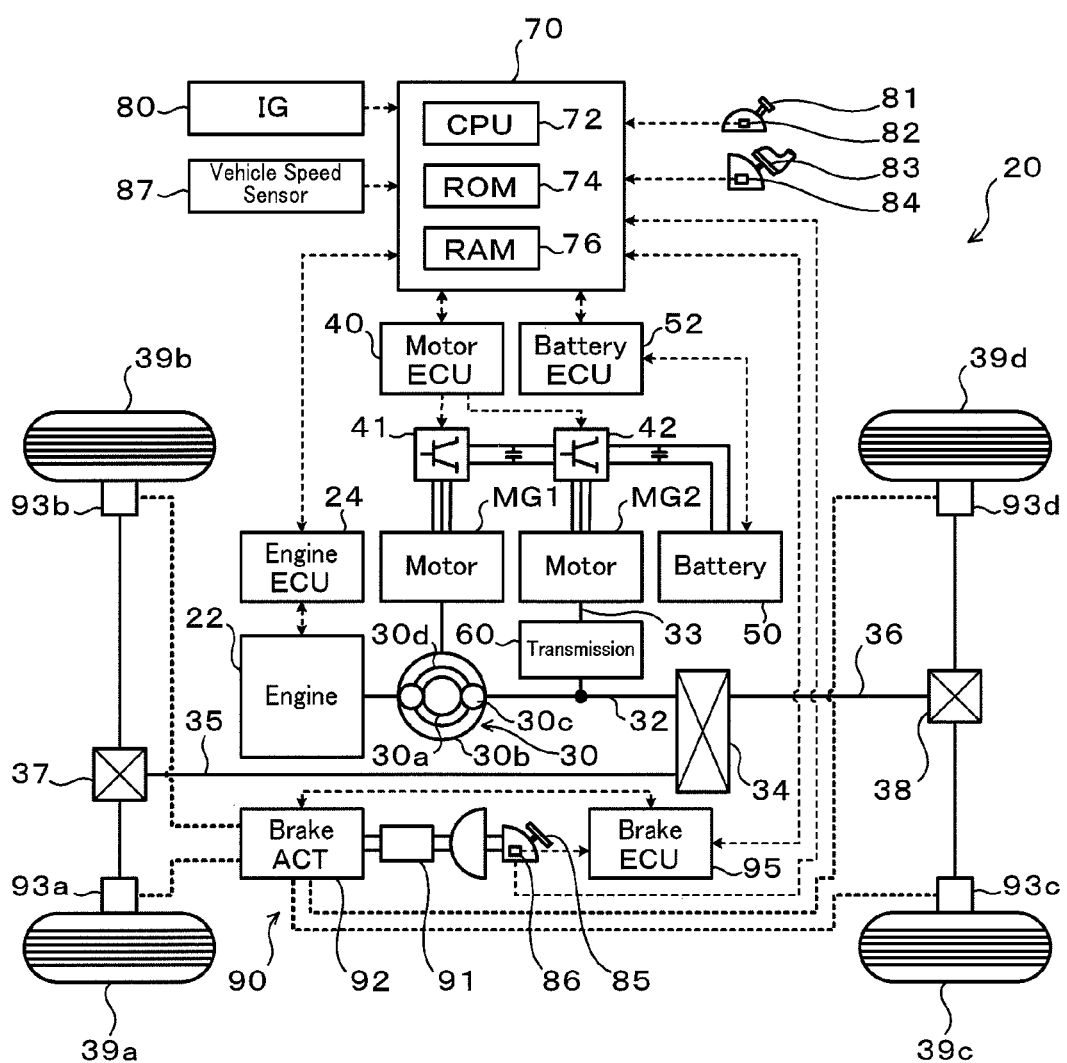
FIG. 1 schematically illustrates the configuration of a hybrid vehicle 20 according to one embodiment of the invention.

FIG. 1 schematically illustrates the configuration of a hybrid vehicle 20 equipped with a power output apparatus including a driving system according to one embodiment of the invention. The hybrid vehicle 20 shown in FIG. 1 is constructed as a 4-wheel drive vehicle and includes an engine 22, a three shaft-type power distribution integration mechanism 30 that is linked to a crankshaft or an output shaft of the engine 22 via a damper (not shown), a motor MG1 that is linked to the power distribution integration mechanism 30 and has power generation capability, a motor MG2 that is linked to the power distribution integration mechanism 30 via a transmission 60, a transfer 34 that transfers the output power of the power distribution integration mechanism 30 in a distributive manner to a front propeller shaft 35 as a first shaft and a rear propeller shaft 36 as a second shaft, an electronically-controlled hydraulic brake unit (hereafter simply referred to as 'brake unit') 90, and a hybrid electronic control unit (hereafter referred to as 'hybrid ECU') 70 that controls the operations of the whole hybrid vehicle 20.

The engine 22 is an internal combustion engine that receives a supply of a hydrocarbon fuel, such as gasoline or light oil, and outputs power. An engine electronic control unit (hereafter referred to as 'engine ECU') 24 controls the operations of the engine 22, for example, the amount of fuel injection, the ignition timing, and the amount of intake air. The engine ECU 24 inputs signals from various sensors that are provided for the engine 22 to measure and detect the operating conditions of the engine 22. The engine ECU 24 establishes communication with the hybrid ECU 70 to drive and control the engine 22 in response to control signals received from the hybrid ECU 70 and the signals received from the various sensors and to output data regarding the operating conditions of the engine 22 to the hybrid ECU 70 according to the requirements.

The power distribution integration mechanism 30 typically includes a sun gear 30a as an external gear, a ring gear 30b as an internal gear arranged concentrically with the sun gear 30a, multiple pinion gears 30c engaging with the sun gear 30a and with the ring gear 30b, and a carrier 30d holding the multiple pinion gears 30c to allow both their revolutions and their rotations on their axes. The power distribution integration mechanism 30 is constructed as a planetary gear mechanism having the sun gear 30a, the ring gear 30b, and the carrier 30d as rotational elements of differential motions. The carrier 30d, the sun gear 30a, and the ring gear 30b of the power distribution integration mechanism 30 are respectively linked to the crankshaft of the engine 22, to the motor MG1, and to the transmission 60 linked with the motor MG2 via a ring gear shaft 32. When the motor MG1 functions as a generator, the power distribution integration mechanism 30 distributes the power of the engine 22 input via the carrier 30d into the sun gear 30a and the ring gear 30b corresponding to their gear ratio. When the motor MG1 functions as a motor, on the other hand, the power distribution integration mechanism 30 integrates the power of the engine 22 input via the carrier 30d with the power of the motor MG1 input via the sun gear 30a and outputs the integrated power to the ring gear 30b. The power output to the ring gear 30b is transmitted through the ring gear shaft 32 as the driveshaft to the transfer 34 as the power distribution transfer structure.

The transfer 34 includes a center differential (not shown) connecting with the ring gear shaft 32 as the driveshaft, the front propeller shaft 35 as the first shaft, and the rear propeller shaft 36 as the second shaft and a limited slip differential (limited slip differential clutch, not shown) that limits differential motions of the center differential. The transfer 34 works to distribute and transfer the power output to the ring gear shaft 32 into the front propeller shaft 35 and the rear propeller shaft 36. In the structure of this embodiment, the transfer 34 has the center differential of a planetary gear system, which basically distributes the power output to the ring gear shaft 32 at a fraction D (for example, D=0.6) to the rear propeller shaft 36 and at a fraction (1-D) to the front propeller shaft 35. A carrier, a sun gear, and a ring gear included in the planetary gear system of the center differential are respectively connected to the ring gear shaft 32 or the driveshaft, to the front propeller shaft 35 via a chain, and to the rear propeller shaft 36. The limited slip differential of the transfer 34 is driven by an electronically-controlled hydraulic unit (not shown) to limit the differential motions of the carrier and the sun gear included in the planetary gear system of the center differential and to enable direct linkage of the carrier with the sun gear. The power distributed to the front propeller shaft 35 by means of the transfer 34 is output to front wheels 39a and 39b via a front differential gear 37. The power distributed to the rear propeller shaft 36 by means of the transfer 34 is output to rear wheels 39c and 39d via a rear differential gear 38.

Both the motors MG1 and MG2 are known synchronous motor generators that are driven as a generator and as a motor. The motors MG1 and MG2 transmit electric power to and from a battery 50 via inverters 41 and 42. Power lines 54 that connect the inverters 41 and 42 with the battery 50 are constructed as a positive electrode bus line and a negative electrode bus line shared by the inverters 41 and 42. This arrangement enables the electric power generated by one of the motors MG1 and MG2 to be consumed by the other motor. The battery 50 is charged with a surplus of the electric power generated by the motor MG1 or MG2 and is discharged to supplement an insufficiency of the electric power. When the power balance is attained between the motors MG1 and MG2, the battery 50 is neither charged nor discharged. Operations of both the motors MG1 and MG2 are controlled by a motor electronic control unit (hereafter referred to as motor ECU) 40. The motor ECU 40 receives diverse signals required for controlling the operations of the motors MG1 and MG2, for example, signals from rotational position detection sensors (not shown) that detect the rotational positions of rotors in the motors MG1 and MG2, phase currents applied to the motors MG1 and MG2 and measured by current sensors (not shown) and motor temperature T1 and T2 from temperature sensors (not shown) respectively attached to the motors MG1 and MG2. The motor ECU 40 outputs switching control signals to the inverters 41 and 42. The motor ECU 40 communicates with the hybrid ECU 70 to control operations of the motors MG1 and MG2 in response to control signals transmitted from the hybrid ECU 70 while outputting data relating to the operating conditions of the motors MG1 and MG2 to the hybrid ECU 70 according to the requirements.

The battery 50 is under control of a battery electronic control unit (hereafter referred to as battery ECU) 52. The battery ECU 52 receives diverse signals required for control of the battery 50, for example, an inter-terminal voltage measured by a voltage sensor (not shown) disposed between terminals of the battery 50, a charge-discharge current measured by a current sensor attached to the power line connected with the output terminal of the battery 50, and a battery temperature measured by a temperature sensor (not shown) attached to the battery 50. The battery ECU 52 outputs data relating to the state of the battery 50 to the hybrid ECU 70 and the engine ECU 24 via communication according to the requirements. The battery ECU 52 calculates a state of charge SOC of the battery 50, based on the accumulated charge-discharge current measured by the current sensor, for control of the battery 50.

Figure 2:
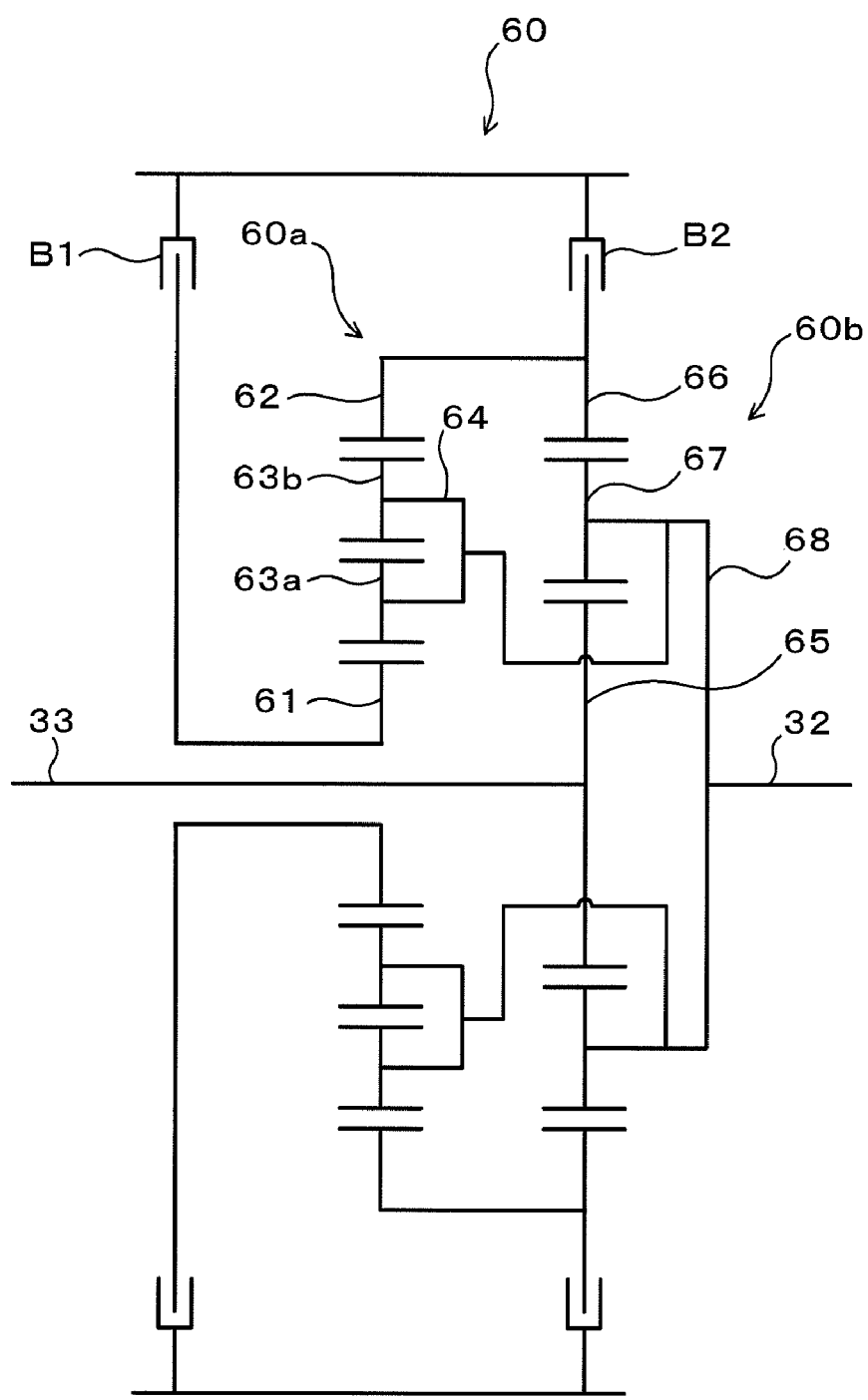
FIG. 2 shows the schematic structure of a transmission 60.

The transmission 60 is designed to connect and disconnect a rotating shaft 33 of the motor MG2 with and from the ring gear shaft 32 and to selectively set their speed change ratio (that is expressed by the rotation speed of the rotating shaft 33/the rotation speed of the ring gear shaft 32 and is equivalent to a reduction ratio for the motor MG2) among multiple speeds in connection of the rotating shaft 33 with the ring gear shaft 32. In the structure of this embodiment, the transmission 60 is constructed to reduce the rotation speed of the rotating shaft 33 of the motor MG2 at two different reduction ratios and transmit the reduced rotation speed to the ring gear shaft 32. The output power of the motor MG2 is thus basically decelerated by the transmission 60, and the decelerated power is input into the ring gear shaft 32. The output power of the ring gear shaft 32 is, on the other hand, accelerated by the transmission 60, and the accelerated power is input into the motor MG2. One typical structure of the transmission 60 is shown in FIG. 2. The transmission 60 of FIG. 2 has a double-pinion planetary gear mechanism 60a, a single-pinion planetary gear mechanism 60b, and two brakes B1 and B2. The double-pinion planetary gear mechanism 60a includes a sun gear 61 as an external gear, a ring gear 62 as an internal gear arranged concentrically with the sun gear 61, multiple first pinion gear 63a engaging with the sun gear 61, multiple second pinion gears 63b engaging with the multiple first pinion gears 63a and with the ring gear 62, and a carrier 64 coupling the multiple first pinion gears 63a with the multiple second pinion gears 63b to allow both their revolutions and their rotations on their axes. In this double-pinion planetary gear mechanism 60a, controlling engagement and release of the brake B1 stops and allows rotation of the sun gear 61. The single-pinion planetary gear mechanism 60b includes a sun gear 65 as an external gear, a ring gear 66 as an internal gear arranged concentrically with the sun gear 65, multiple pinion gears 67 engaging with the sun gear 65 and with the ring gear 66, and a carrier 68 holding the multiple pinion gears 67 to allow both their revolutions and their rotations on their axes. The sun gear 65 and the carrier 68 of the single-pinion planetary gear mechanism 60b are respectively connected to the rotating shaft 33 of the motor MG2 and to the ring gear shaft 32. In this single-pinion planetary gear mechanism 60b, controlling engagement and release of the brake B2 stops and allows rotation of the ring gear 66. The double-pinion planetary gear mechanism 60a and the single-pinion planetary gear mechanism 60b are coupled with each other via linkage of the respective ring gears 62 and 66 and linkage of the respective carriers 64 and 68. In the transmission 60, the combination of the released brakes B1 and B2 disconnects the rotating shaft 33 of the motor MG2 from the ring gear shaft 32. The combination of the released brake B1 and the engaged brake B2 reduces the rotation of the rotating shaft 33 of the motor MG2 at a relatively high reduction ratio and transmits the largely reduced rotation to the ring gear shaft 32. This state is hereafter expressed as 'Lo gear position'. The combination of the engaged brake B1 and the released brake B2 reduces the rotation of the rotating shaft 33 of the motor MG2 at a relatively low reduction ratio and transmits the slightly reduced rotation to the ring gear shaft 32. This state is hereafter expressed as 'Hi gear position'. The combination of the engaged brakes B1 and B2 prohibits the rotations of the rotating shaft 33 and the ring gear shaft 32. In the structure of the embodiment, the brakes B1 and B2 are engaged and released by controlling the operations of hydraulic actuators (not shown) to regulate hydraulic pressures applied to the brakes B1 and B2.

The brake unit 90 includes a master cylinder 91, a fluid pressure (hydraulic) brake actuator 92, wheel cylinders 93a to 93d that drive respective pairs of brake pads holding there between brake discs respectively attached to the front wheels 39a and 39b and the rear wheels 39c and 39d to apply frictional braking forces (frictional braking torques) to the corresponding wheels 39a to 39d, and a brake electronic control unit (hereafter referred to as 'brake ECU') 95 that controls the operations of the brake actuator 92. Although not being specifically illustrated, the brake actuator 92 has a pump and an accumulator as a hydraulic source, a master cylinder cut solenoid valve that regulates the connection and disconnection of the master cylinder 91 with and from the respective wheel cylinders 93a to 93d, a stroke simulator that creates a reactive force against a pedal depression force corresponding to the driver's depression amount of a brake pedal 85, and multiple valves that enable independent application of braking torques to the respective wheels 39a to 39d. The brake ECU 95 inputs via signal lines (not shown) a master cylinder pressure detected by a master cylinder pressure sensor (not shown), wheel cylinder pressures detected as hydraulic pressures of the respective wheels cylinders 93a to 93d by respective wheel cylinder pressure sensors (not shown), wheel speeds measured by respective wheel speed sensors (not shown), and a steering angle detected by a steering angle sensor (not shown). The brake ECU 95 transmits various signals to and from the hybrid ECU 70 by communication. The brake ECU 95 controls the operation of the brake actuator 92 to ensure application of a specific braking torque to the respective wheels 39a to 39d. The specific braking torque corresponds to a required division of braking torque to be applied by the brake unit 90 out of the total braking torque to be applied to the hybrid vehicle 20. The brake ECU 95 also controls the operation of the brake actuator 92 to ensure independent application of braking torques to the respective wheels 39a to 39d, irrespective of the driver's depression of the brake pedal 85. The brake ECU 95 performs ABS control, traction control (TRC), and vehicle stability control (VSC) according to diverse parameters detected and measured by various sensors (not shown), for example, the wheel speeds, the steering angle, accelerations in a longitudinal direction and in a lateral direction of the vehicle body, and a yaw rate.

The hybrid ECU 70 is constructed as a microprocessor including a CPU 72, a ROM 74 that stores processing programs, a RAM 76 that temporarily stores data, and a non-illustrated input-output port, and a non-illustrated communication port. The hybrid ECU 70 receives various inputs via the input port: an ignition signal from an ignition switch (start switch) 80, a gearshift position SP from a gearshift position sensor 82 that detects the current position of a gearshift lever 81, an accelerator opening Acc from an accelerator pedal position sensor 84 that measures a step-on amount of an accelerator pedal 83, a brake pedal position BP from a brake pedal position sensor 86 that measures a step-on amount of a brake pedal 85, and a vehicle speed V from a vehicle speed sensor 87. The hybrid ECU 70 communicates with the engine ECU 24, the motor ECU 40, the battery ECU 52 and the brake ECU 95 via the communication port to transmit diverse control signals and data to and from the engine ECU 24, the motor ECU 40, the battery ECU 52 and brake ECU 95, as mentioned previously.

The hybrid vehicle 20 of the embodiment thus constructed calculates a torque demand Tr* to be output to the ring gear shaft 32 functioning as the drive shaft, based on observed values of a vehicle speed V and an accelerator opening Acc, which corresponds to a driver's step-on amount of an accelerator pedal 83. The engine 22 and the motors MG1 and MG2 are subjected to operation control to output a required level of power corresponding to the calculated torque demand Tr* to the ring gear shaft 32. The operation control of the engine 22 and the motors MG1 and MG2 selectively effectuates one of a torque conversion drive mode, a charge-discharge drive mode, and a motor drive mode. The torque conversion drive mode controls the operations of the engine 22 to output a quantity of power equivalent to the required level of power, while driving and controlling the motors MG1 and MG2 to cause all the power output from the engine 22 to be subjected to torque conversion by means of the power distribution integration mechanism 30 and the motors MG1 and MG2 and output to the ring gear shaft 32. The charge-discharge drive mode controls the operations of the engine 22 to output a quantity of power equivalent to the sum of the required level of power and a quantity of electric power consumed by charging the battery 50 or supplied by discharging the battery 50, while driving and controlling the motors MG1 and MG2 to cause all or part of the power output from the engine 22 equivalent to the required level of power to be subjected to torque conversion by means of the power distribution integration mechanism 30 and the motors MG1 and MG2 and output to the ring gear shaft 32, simultaneously with charge or discharge of the battery 50. The motor drive mode stops the operations of the engine 22 and drives and controls the motor MG2 to output a quantity of power equivalent to the required level of power to the ring gear shaft 32.

Figure 3:
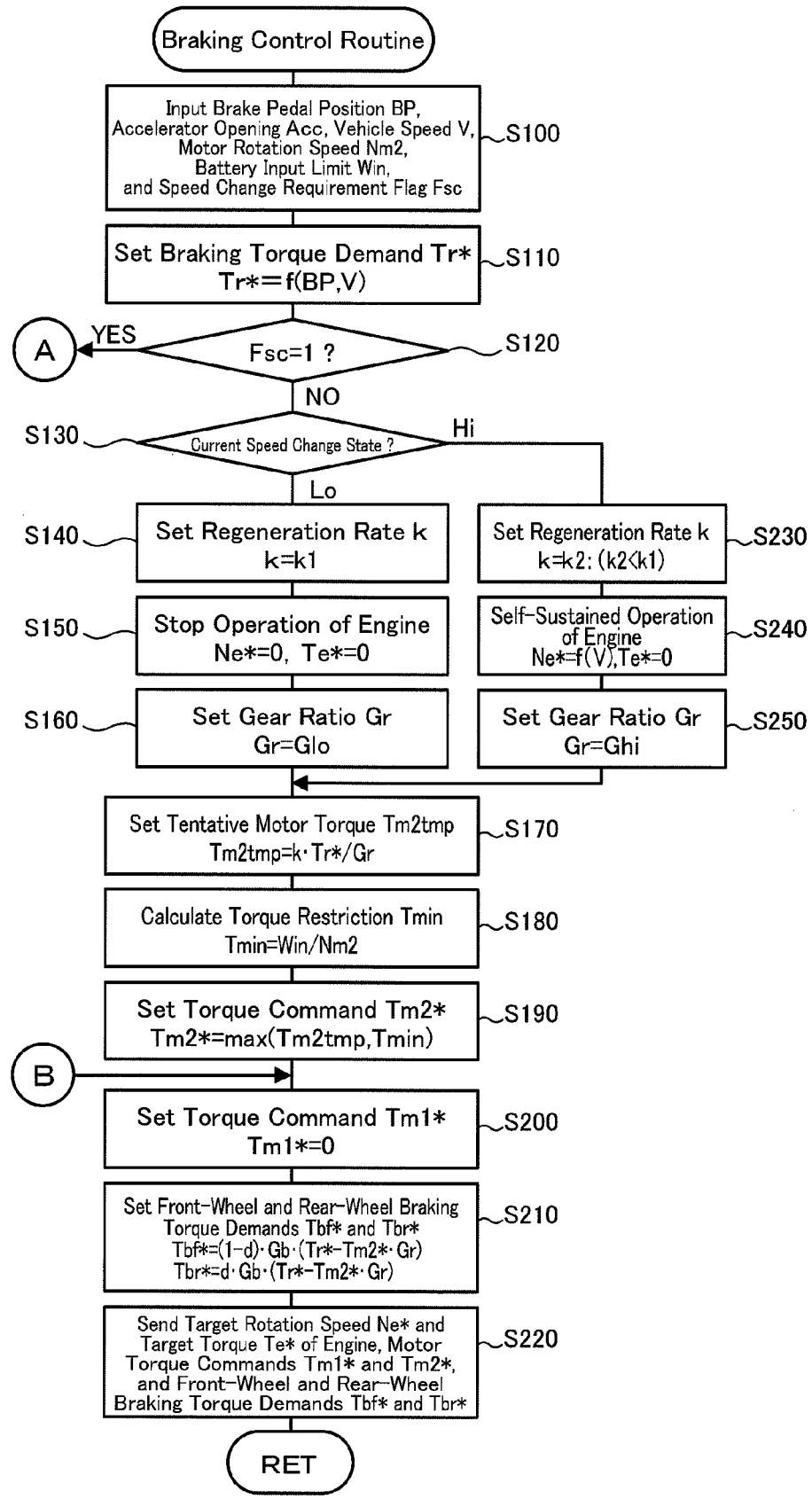
FIG. 3 is a flowchart showing a braking control routine executed by a hybrid ECU 70 in the embodiment.
Figure 4:
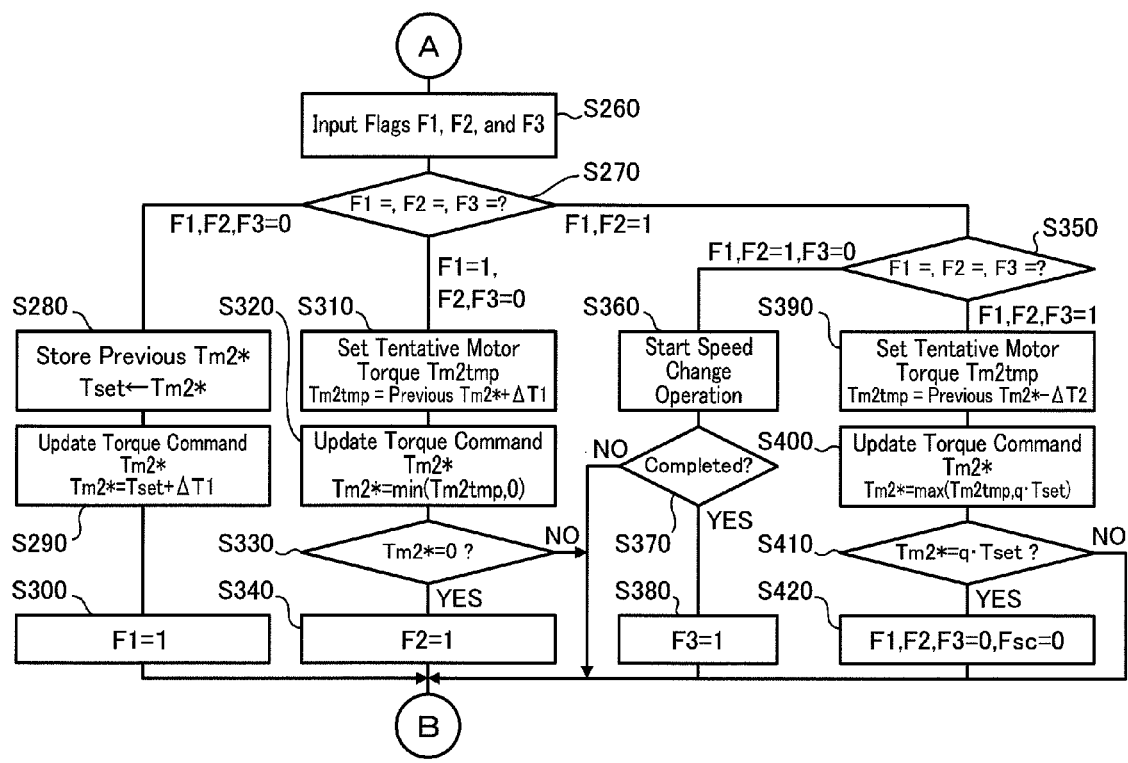
FIG. 4 is a flowchart showing the braking control routine executed by the hybrid ECU 70 in the embodiment.

The following description regards a series of control operations during braking of the hybrid vehicle 20 constructed as described above. FIGS. 3 and 4 are flowcharts showing a braking control routine that is executed at preset time interval (for example, at every several msec) by the hybrid ECU 70.

Figure 5:
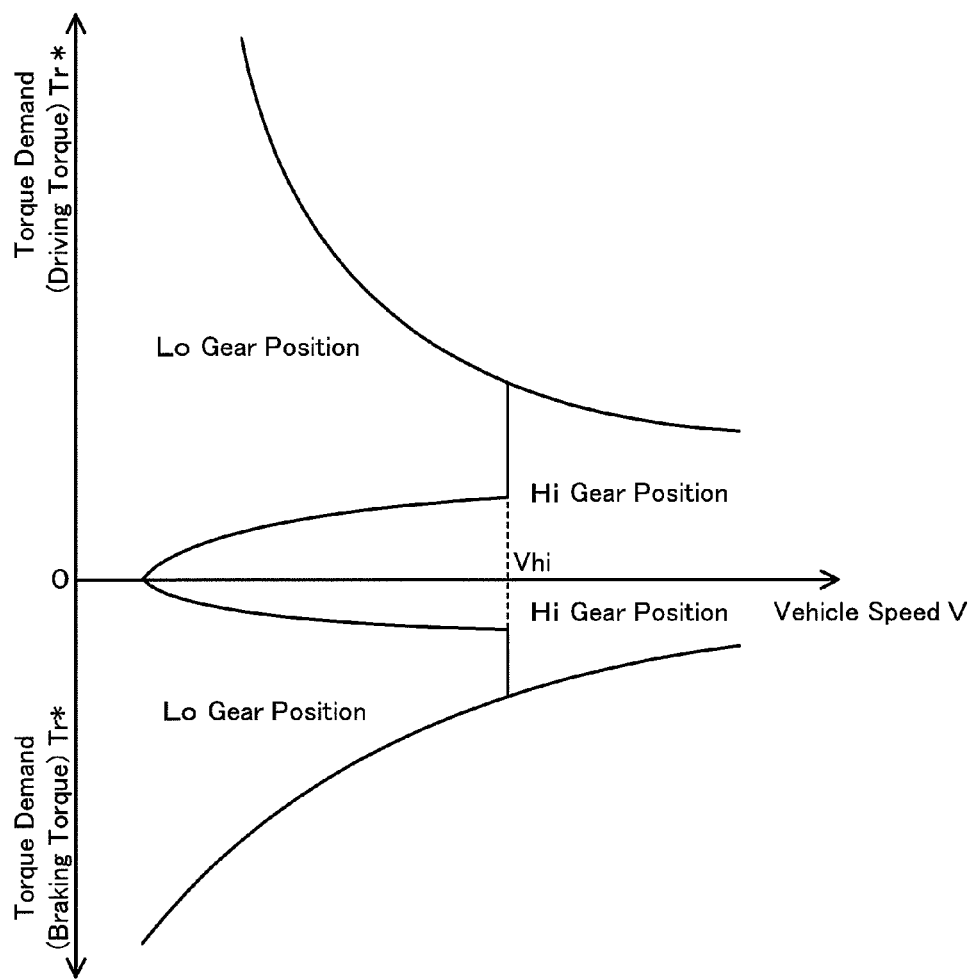
FIG. 5 shows one example of a speed change state detection map.

On the start of the braking control routine shown in the flowcharts of FIGS. 3 and 4, the CPU 72 of the hybrid ECU 70 first inputs various data required for control, that is, the accelerator opening Acc from the accelerator pedal position sensor 84, the brake pedal position BP from the brake pedal position sensor 86, the vehicle speed V from the vehicle speed sensor 87, a rotation speed Nm2 of the motor MG2, an input limit Win as an allowable level of electric power to charge the battery 50, and the setting of a speed change requirement flag Fsc (step S100). The rotation speed Nm2 of the motor MG2 is received from the motor ECU 40 by communication. The input limit Win of the battery 50 is set according to the temperature and the current state of charge SOC of the battery 50 and is received from the battery ECU 52 by communication. The speed change requirement flag Fsc is set by a speed change detection routine (not shown) that is separately performed by the hybrid ECU 70 to detect the speed change state of the transmission 60 between the Lo gear position and the Hi gear position, and is registered in a predetermined storage area. A concrete procedure of setting the speed change requirement flag Fsc in this embodiment experimentally and analytically determines in advance variations in speed change state of the transmission 60 against the vehicle speed V and a torque demand Tr* (where positive values represent driving torques and negative values represent braking torques) and stores the determined variations as a speed change state detection map in the ROM 74. The speed change state of the transmission 60 is specified corresponding to the given vehicle speed V and the given torque demand Tr* by referring to the speed change state detection map. Based on the specified speed change state of the transmission 60, the speed change requirement flag Fsc is set to 0 upon no requirement for a change of the speed change state (speed change ratio) of the transmission 60, while being set to 1 upon requirement for a change of the speed change state (speed change ratio) of the transmission 60. One example of the speed change state detection map is shown in FIG. 5. The speed change state detection map of FIG. 5 is designed to set speed change curves for efficient energy regeneration by the motor MG2. In the speed change state detection map of FIG. 5, by taking into account the requirement for operation control of the motor MG2 at a rotation speed of or below its maximum possible rotation speed, the speed change state of the transmission 60 is set to the Hi gear position irrespective of the value of the torque demand (braking torque) Tr* when the vehicle speed V increases to or over a preset vehicle speed Vhi corresponding to a slightly lower rotation speed than the maximum possible rotation speed.

Figure 6:
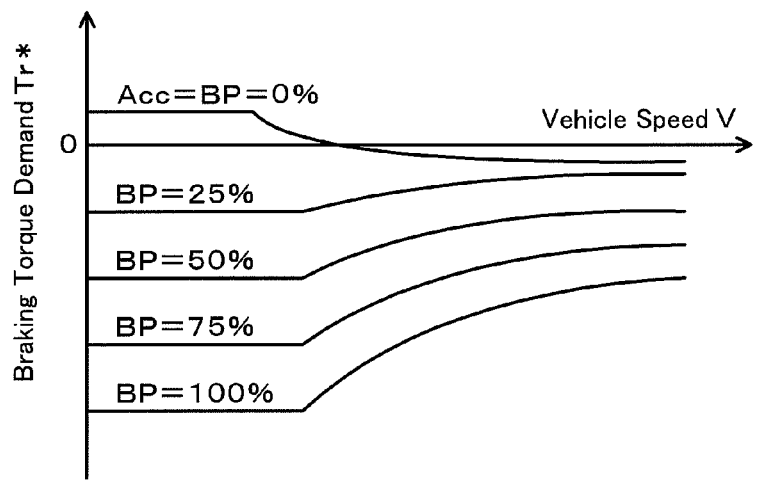
FIG. 6 shows one example of a braking torque demand setting map.

After the data input at step S100, the braking torque demand Tr* to be output to the ring gear shaft 32 or the driveshaft is set as a braking torque required for the hybrid vehicle 20, based on the input accelerator opening Acc or the input brake pedal position BP and the input vehicle speed V (step S110). A concrete procedure of setting the braking torque demand Tr* in this embodiment stores in advance variations in braking torque demand Tr* against the accelerator opening Acc or the brake pedal position BP and the vehicle speed V as a braking torque demand setting map in the ROM 74 and reads the braking torque demand Tr* corresponding to the given accelerator opening Acc or the given brake pedal position BP and the given vehicle speed V from this braking torque demand setting map. One example of the braking torque demand setting map is shown in FIG. 6. The CPU 72 then determines whether the speed change requirement flag Fsc input at step S100 is equal to 1 (step S120). This determination identifies requirement or non-requirement for a change of the speed change state (speed change ratio) of the transmission 60. In the description hereafter, this requirement is referred to as 'speed change requirement'. When the speed change requirement flag Fsc is equal to 0 representing no speed change requirement, the CPU 72 detects the current speed change state of the transmission 60 (step S130). When the current speed change state of the transmission 60 is set to the Lo gear position, a regeneration rate 'k' is set to a predetermined value k1 (step S140). The regeneration rate 'k' represents the ratio of a regenerative braking torque by the motor MG2 to the braking torque demand Tr*. This is equivalent to the ratio of the braking force generated by the brake unit 90 to the regenerative braking force. The value k1 is in a range between 0 and 1 and is set to maximize recovery of kinetic energy of the hybrid vehicle 20 in an efficient energy regeneration range by the motor MG2. The CPU 72 subsequently sets a target rotation speed Ne* and a target torque Te* of the engine 22 to zero (step S150), in order to stop the operation of the engine 22. The CPU 72 then sets a gear ratio Gr of the transmission 60 to a low gear ratio Glo representing the Lo gear position (step S160).

A tentative motor torque Tm2tmp is calculated by dividing the product of the braking torque demand Tr* and the regeneration rate 'k' set at step S140 by the gear ratio Gr of the transmission 60 (step S170). A torque restriction Tmin of the motor MG2 is calculated by dividing the input limit Win of the battery 50 by the rotation speed Nm2 of the motor MG2 input at step S100 (step S180). A torque command Tm2* of the motor MG2 is then set by limiting the tentative motor torque Tm2tmp to the torque restriction Tmin calculated at step S180 (step S190). Such limited setting of the torque command Tm2* enables the motor MG2 to output the regenerative braking torque in the range of the input limit Win of the battery 50. A torque command Tm1* of the motor MG1 is set equal to 0 (step S200) After setting the torque commands Tm1* and Tm2* of the motors MG1 and MG2, the CPU 72 calculates a front wheel braking torque demand Tbf* to be applied to the front wheels 39a and 39b by the brake unit 90 and a rear wheel braking torque demand Tbr* to be applied to the rear wheels 39c and 39d by the brake unit 90 (step S210). The calculation of the front wheel braking torque demand Tbf* and the rear wheel braking torque demand Tbr* is based on a predetermined front-rear braking torque distribution rate 'd' and the product of a result of subtraction of a regenerative braking torque (=Tm2*·Gr) by the motor MG2 from the braking torque demand Tr* and a predetermined conversion coefficient Gb. The product represents a division of the torque demand Tr* to be applied by the brake unit 90. In the embodiment, the front-rear braking torque distribution rate 'd' shows a fraction of braking torque to be applied to the rear wheels 39c and 39d out of the division of the torque demand Tr* to be applied by the brake unit 90. The front-rear braking torque distribution rate 'd' is set equal to the fraction D, since the transfer 34 basically distributes and transfers the power output to the ring gear shaft 32 into the rear propeller shaft 36 and the front propeller shaft 35 at the ratio of D:(1−D). The conversion coefficient Gb is determined in advance for conversion of the braking torque to be output to the ring gear shaft 32 or the driveshaft to the torques output to the front wheels 39a and 39b and the rear wheels 39c and 39d.

After setting the target rotation speed Ne* and the target torque Te* of the engine 22, the torque commands Tm1* and Tm2* of the motors MG1 and MG2, and the front wheel braking torque demand Tbf* and the rear wheel braking torque demand Tbr*, the CPU 72 sends the target rotation speed Ne* and the target torque Te* of the engine 22 to the engine ECU 24, the torque commands Tm1* and Tm2* of the motors MG1 and MG2 to the motor ECU 40, and the front wheel braking torque demand Tbf* and the rear wheel braking torque demand Tbr* to the brake ECU 95 (step S220) and repeats the series of processing of and after step S100. The engine ECU 24 receives the target rotation speed Ne* and the target torque Te* and performs required controls to attain the operation of the engine 22 with the target rotation speed Ne* and the target torque Te*. The motor ECU 40 receives the torque commands Tm1* and Tm2* and performs switching control of switching elements included in the respective inverters 41 and 42 to enable the operation of the motor MG1 with the torque command Tm1* and the operation of the motor MG2 with the torque command Tm2*. The brake ECU 95 receives the front wheel braking torque demand Tbf* and the rear wheel braking torque demand Tbr* and controls the operation of the brake actuator 92 to enable application of a frictional braking torque (½·Tbf*) to the front wheels 39a and 39b based on the front wheel braking torque demand Tbf* and application of a frictional braking torque (½Tbr*) to the rear wheels 39c and 39d based on the rear wheel braking torque demand Tbr*.

When the speed change requirement flag Fsc is equal to 0 representing no speed change requirement for the transmission 60 (step S120) and when the current speed change state of the transmission 60 is set to the Hi gear position (step S130), on the other hand, the regeneration rate 'k' is set to a smaller value k2 than the predetermined value k1 (step S230). The CPU 72 subsequently sets the target torque Te* of the engine 22 to 0 and sets the target rotation speed Ne* of the engine 22 corresponding to the vehicle speed V by referring to a map (not shown) to enable self-sustained operation of the engine 22 at an independent rotation speed corresponding to the vehicle speed V without substantial torque output (step S240). The gear ratio Gr of the transmission 60 is then set to a high gear ratio Ghi representing the Hi gear position (step S250). The CPU 72 then sets the torque commands Tm1* and Tm2* of the motors MG1 and MG2 and the front wheel braking torque demand Tbf* and the rear wheel braking torque demand Tbr*, based on the torque demand Tr* and the regeneration rate 'k' (steps S170 to S210) and sends the respective settings to the engine ECU 24, the motor ECU 40, and the brake ECU 95 (step S220) as described above. At the Hi gear position set in the transmission 60, the engine 22 is not stopped but is self-sustained at the independent rotation speed corresponding to the vehicle speed V. This ensures favorable acceleration performance to enable prompt output of a required driving force from the engine 22 in response to the driver's depression of the accelerator pedal 83 after release of the brake pedal 85.

When the speed change requirement flag Fsc input at step S100 is equal to 1 representing the speed change requirement at step S120, a subsequent change of the speed change state (speed change ratio) is expected in the transmission 60. In this case, the CPU 72 inputs the settings of flags F1, F2, and F3 (step S260) and checks the values of the flags F1, F2, and F3 (step S270) in the flowchart of FIG. 4. The flags F1, F2, and F3 sequentially show execution steps in the course of a change of the speed change state of the transmission 60 and are respectively set equal to 0 at the time of detection of the speed change requirement. Immediately after detection of the speed change requirement at step S120, the torque command Tm2* of the motor MG2 set at that moment (previous setting) is stored as a storage value Tset in the RAM 76 (step S280). In order to enable a gradual decrease of the regenerative braking torque, the torque command Tm2* is updated as the sum of the storage value Tset and a specific torque ΔT1 (relatively small positive value) (step S290). The CPU 72 then sets the flag F1 to 1 (step S300) and executes the processing of and after step S200 as described previously. The specific torque ΔT1 is set to ensure smooth variations of the regenerative braking torque generated by the motor MG2 and of the braking torque applied by the brake unit 90 at the execution intervals of the braking control routine. The specific torque ΔT1 depends upon the performances of the motor MG2, the brake actuator 92, the brake discs, and the transmission 60. In the case of setting the flag F1 to 1 at step S300, at a next cycle of the braking control routine, it is determined at step S270 that only the flag F1 is equal to 1 among the flags F1 to F3. In this case, in order to ensure a further gradual decrease of the regenerative braking torque, the tentative motor torque Tm2tmp is set to the sum of the specific torque ΔT1 and the previous setting of the torque command Tm2* (step S310). The torque command Tm2* is then updated by limiting the tentative motor torque Tm2tmp to an upper limit value '0' (step S320). It is subsequently determined whether the updated torque command Tm2* is equal to 0 (step S330). When the updated torque command Tm2* is not equal to 0, the CPU 72 executes the processing of and after step S200 as described previously. When the torque command Tm2* updated at step S320 is equal to 0, on the other hand, the CPU 72 sets the flag F2 to 1 (step S340) and executes the processing of and after step S200 as described previously.

Figure 7:
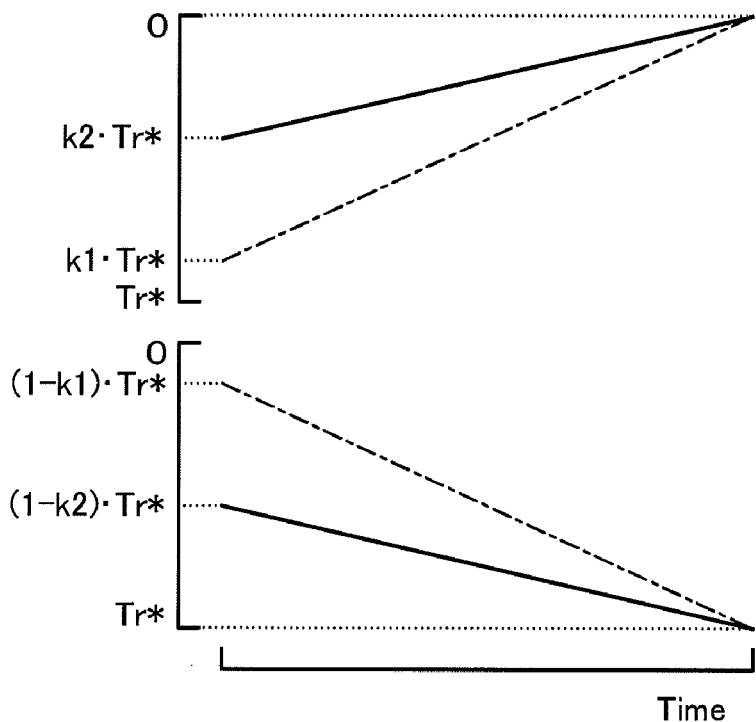
FIG. 7 shows replacement of a regenerative braking torque generated by a motor MG2 with a braking torque generated by a brake unit 90.

The processing of steps S200 to S220 is repeated with execution of steps S280 to S300 and steps S310 to S330 as described above. The fraction of the regenerative braking torque generated by the motor MG2 and the fraction of the braking torque applied by the brake unit 90 relative to the braking torque demand Tr* are determined to attain a gradual decrease of the regenerative braking torque with an increase of the torque command Tm2* by the specific torque ΔT1 on every execution of the braking control routine, simultaneously with a gradual increase of the division of the braking torque demand Tr* to be applied by the brake unit 90 by the product of the specific torque ΔT1 and the conversion coefficient Gb. The regenerative braking torque by the motor MG2 is gradually replaced with the braking torque by the brake unit 90 and eventually reaches to 0 as shown in FIG. 7. During this process, the braking torque by the brake unit 90 is distributed at the front-rear braking torque distribution rate 'd' and output to the front wheels 39a and 39b and to the rear wheels 39c and 39d. In the graph of FIG. 7, the plots of solid line represent replacement of the regenerative braking torque by the motor MG2 with the braking torque by the brake unit 90 at the time of a change of the speed change state from the Hi gear position to the Lo gear position. The plots of one-dot chain line represent replacement of the regenerative braking torque by the motor MG2 with the braking torque by the brake unit 90 at the time of a change of the speed change state from the Lo gear position to the Hi gear position. As clearly understood from these plots, the regenerative braking torque generated by the motor MG2 (torque command Tm2*) on the start of execution of step S260 is smaller at the time of the change of the speed change state from the Hi gear position with the regeneration rate 'k' set to the smaller value k2 to the Lo gear position than that at the time of the change of the speed change state from the Lo gear position to the Hi gear position. At the time of a change of the speed change state from the Hi gear position to the Lo gear position, there is accordingly the smaller torque to be replaced with the braking torque by the brake unit 90 by the processing of and after step S260. Setting the smaller fraction of the regenerative braking torque relative to the braking torque demand Tr* (that is, the smaller regeneration rate 'k') at the Hi gear position with the lower speed change ratio of the transmission 60 than the regeneration rate 'k' at the Lo gear position desirably reduces a difference of the total braking torque before and after the replacement of the regenerative braking torque by the motor MG2 with the braking torque by the brake unit 90, even when there is some variation in braking force applied to the respective wheels 39a to 39d due to the varying conditions and the time change of the brake unit 90. During the braking of the hybrid vehicle 20, there is a high tendency of the change of the speed change state from the Hi gear position with the lower speed change ratio of the transmission 60 to the Lo gear position with the higher speed change ratio of the transmission 60 as shown in the map of FIG. 5. Setting the smaller fraction of the regenerative braking torque relative to the braking torque demand Tr* (that is, the smaller regeneration rate 'k') at the Hi gear position than the regeneration rate 'k' at the Lo gear position is thus advantageous for a smooth change of the speed change state in the transmission 60. In the graph of FIG. 7, the division of braking torque to be applied by the brake unit 90 is expressed in conversion to the torque applied to the ring gear shaft 32.

In the case of setting both the flags F1 and F2 to 1 by the series of processing described above, it is determined at steps S270 and S350 that the flags F1 and F2 are equal to 1 and the flag F3 is equal to 0. A speed change operation of the transmission 60 then starts at this phase (step S360). At the setting of the speed change state to the Hi gear position in the transmission 60, the speed change operation of step S360 releases the brake B1 and engages the brake B2. At the setting of the speed change state to the Lo gear position in the transmission 60, on the other hand, the speed change operation of step S360 engages the brake B1 and releases the brake B2. It is then determined whether the speed change operation of the transmission 60 is completed (step S370). Upon determination of the incomplete speed change operation in the transmission 60, the CPU 72 executes the processing of and after step S200 as described previously. Upon determination of the complete speed change operation in the transmission 60, on the other hand, the CPU 72 sets the flag F3 to 1 (step S380) and executes the processing of and after step S200 as described previously. The speed change operation of step S360 gradually engages the brake B2 with releasing the brake B1 (at the time of the change of the speed change state from the Hi gear position to the Lo gear position) or reengages the brake B1 after release of both the brakes B1 and B2 (at the time of the change of the speed change state from the Lo gear position to the Hi gear position). This lowers a torque transmission rate by the transmission 60 and may cause a torque shock with omission of the braking torque (regenerative braking torque) in the absence of any specific countermeasure. In the hybrid vehicle 20 of the embodiment, however, before the start of the speed change operation at step S360, the regenerative braking torque by the motor MG2 is gradually decreased to zero. There is thus substantially little torque shock caused by the speed change operation of the transmission 60. This ensures an extremely smooth speed change of the transmission 60. During the speed change operation, the braking toque demand Tr* is fully satisfied by the braking torque applied by the brake unit 90. The braking torque applied by the brake unit 90 is distributed at the front-rear braking torque distribution rate 'd' and output to the front wheels 39a and 39b and to the rear wheels 39c and 39d.

After completion of the speed change operation of the transmission 60 and setting of the flag F3 to 1, it is determined at step S350 that the flags F1, F2, and F3 are all equal to 1. In this case, in order to ensure a gradual increase of the regenerative braking torque, the tentative motor torque Tm2tmp is set to the result of subtraction of a specific torque ΔT2 (positive value) from the previous setting of the torque command Tm2* (step S390). The torque command Tm2* is then updated by limiting the tentative motor torque Tm2tmp to the product of the storage value Tset and a conversion coefficient 'q' as a lower limit value (step S400). The conversion coefficient 'q' is given as the product of a division of the gear ratio before the speed change of the transmission 60 by the gear ratio after the speed change of the transmission 60 and a division of the regeneration rate after the speed change of the transmission 60 by the regeneration rate before the speed change of the transmission 60. It is subsequently determined whether the updated torque command Tm2* is equal to the product of the storage value Tset and the conversion coefficient 'q' (step S410). When the torque command Tm2* updated at step S400 is not equal to the product of the storage value Tset and the conversion coefficient 'q', the CPU 72 executes the processing of and after step S200 as described previously. When the torque command Tm2* updated at step S400 is equal to the product of the storage value Tset and the conversion coefficient 'q', on the other hand, the CPU 72 sets all the flags F1, F2, and F3 and the speed change requirement flag Fsc to 0 (step S420) and executes the processing of and after step S200 as described previously. The processing of steps S200 to S220 is repeated with execution of steps S390 to S420 as described above. The fraction of the regenerative braking torque generated by the motor MG2 and the fraction of the braking torque applied by the brake unit 90 relative to the braking torque demand Tr* are determined to attain a gradual increase of the regenerative braking torque with a decrease of the torque command Tm2* by the specific torque ΔT2 on every execution of the braking control routine, simultaneously with a gradual decrease of the division of the braking torque demand Tr* to be applied by the brake unit 90 by the product of the specific torque ΔT2 and the conversion coefficient Gb. The braking torque by the brake unit 90 is thus gradually replaced with the regenerative braking torque by the motor MG2. During this process, the braking torque by the brake unit 90 is distributed at the front-rear braking torque distribution rate 'd' and output to the front wheels 39a and 39b and to the rear wheels 39c and 39d. The specific torque ΔT2 is set to ensure smooth variations of the regenerative braking torque generated by the motor MG2 and of the braking torque applied by the brake unit 90 at the execution intervals of the braking control routine. The specific torque ΔT2 depends upon the performances of the motor MG2, the brake actuator 92, the brake discs, and the transmission 60.

As described above, the hybrid vehicle 20 of the embodiment is equipped with the motor MG2 that enables output of at least the regenerative braking torque to the ring gear shaft 32 via the transmission 60 and the brake unit 90 that enables independent application of the braking torques to the front wheels 39a and 39b and to the rear wheels 39c and 39d irrespective of the driver's depression of the brake pedal 85. The power output to the ring gear shaft 32 or the driveshaft by the engine 22 and the motor MG2 is distributed to the front propeller shaft 35 and the rear propeller shaft 36 by means of the transfer 34. The hybrid vehicle 20 is thus driven with the powers respectively output to the front wheels 39a and 39b and to the rear wheels 39c and 39d. In response to the driver's braking request operation, for example, the driver's depression of the brake pedal 85, the hybrid vehicle 20 of the embodiment sets the regeneration rate 'k' (step S140 or step S230) and specifies the fraction of the regenerative braking torque by the motor MG2 and the fraction of the braking torque by the brake unit 90 relative to the braking torque demand Tr* (steps S280, S290, S310, S320, S390, and S400) according to the setting of the speed change ratio (gear ratio) of the transmission 60. The hybrid vehicle 20 then controls the motor MG2 to ensure output of the regenerative braking torque based on the braking torque demand Tr* and the specified fraction of the regenerative braking torque, while controlling the brake unit 90 to apply the braking torque at the predetermined front-rear braking torque distribution rate 'd' to the front wheels 39a and 39b and to the rear wheels 39c and 39d based on the braking torque demand Tr* and the regenerative braking torque generated by the motor MG2 (steps S170 to S220) As mentioned above, the fraction of the regenerative braking torque by the motor MG2 and the fraction of the braking torque by the brake unit 90 relative to the braking torque demand Tr* are set according to the setting of the speed change ratio in the transmission 60. In the case of a speed change requirement for the transmission 60 during braking of the hybrid vehicle 20 (step S120), such setting effectively reduces a difference of the total braking torque before and after the change of the speed change state (speed change ratio) and ensures a smooth change of the speed change state in the transmission 60 (step S360). The braking torque applied by the brake unit 90, which depends upon the braking torque demand Tr* and the regenerative braking torque by the motor MG2, is distributed at the front-rear braking torque distribution rate 'd' and output to the front wheels 39a and 39b and to the rear wheels 39c and 39d. Such control desirably reduces a variation in distribution of the braking torque between the front wheels 39a and 39b and the rear wheels 39c and 39d before and after the change of the speed change state in the transmission 60 and thereby keeps the good braking performance. The technique of the invention enables the hybrid vehicle 20 to be driven with the powers respectively output to the front wheels 39a and 39b and to the rear wheels 39c and 39d, while optimizing the braking control of the hybrid vehicle 20 equipped with the motor MG2 having the ability of outputting the regenerative braking torque via the transmission 60.

In the hybrid vehicle 20 of the embodiment, the power output to the ring gear shaft 32 is basically distributed at the fraction D to the rear propeller shaft 36 and at the fraction (1-D) to the front propeller shaft 35. Setting the front-rear braking torque distribution rate 'd' equal to the fraction D as the power distribution rate by the transfer 34 ensures the good braking performance without complicating the braking control operation. The front-rear braking torque distribution rate 'd' may be a constant value or may alternatively be a variable that varies according to the rotation speed of the front propeller shaft 35 and the rotation speed of the rear propeller shaft 36. One modified procedure of braking control may distribute the braking torque at the constant or variable front-rear braking torque distribution rate 'd' to the front wheels 39a and 39b and to the rear wheels 39c and 39d and apply the frictional braking forces independently to the respective wheels 39a to 39d based on the wheel speeds of the respective wheels 39a to 39d.

In the hybrid vehicle 20 of the embodiment, in expectation of a change of the speed change state (speed change ratio) of the transmission 60 in response to the speed change requirement for the transmission 60 at step S120, the fraction of the regenerative braking torque by the motor MG2 and the fraction of the braking torque by the brake unit 90 relative to the braking torque demand Tr* are determined to attain a gradual decrease of the regenerative braking torque simultaneously with a gradual increase of the braking torque by the brake unit 90 (steps S280, S290, S310, and S320). During output of the regenerative braking torque by the motor MG2 in response to the driver's braking request operation, the maximum possible portion of the regenerative braking toque is replaced with the braking torque by the brake unit 90 before the actual change of the speed change state in the transmission 60 at step S360. Such control desirably reduces a variation in braking force (torque shock) caused by the actual change of the speed change state in the transmission 60.

Setting the fraction of the regenerative braking torque by the motor MG2 relative to the braking torque demand Tr* to zero during the actual change of the speed change state in the transmission 60 at step S360 has the greater effect of reducing the variation in braking force (torque shock) caused by the change of the speed change state. It is, however, not essential to set the fraction of the regenerative braking torque to zero during the change of the speed change state in the transmission 60. As long as necessary and sufficient restriction of torque shock is attainable, output of a certain level of the regenerative braking torque by the motor MG2 may be allowed during the change of the speed change state in the transmission 60.

There is a high tendency of the change of the speed change state from the Hi gear position with the lower speed change ratio of the transmission 60 to the Lo gear position with the higher speed change ratio of the transmission 60. Setting the smaller fraction of the regenerative braking torque relative to the braking torque demand Tr* (that is, the smaller regeneration rate 'k') at the Hi gear position with the lower speed change ratio of the transmission 60 than the regeneration rate 'k' at the Lo gear position effectively reduces a variation of the total braking torque before and after the replacement of the regenerative braking torque by the motor MG2 with the braking torque by the brake unit 90. This advantageously ensures a smooth change of the speed change state in the transmission 60. Instead of setting the smaller fraction of the regenerative braking torque relative to the braking torque demand Tr* at the lower speed change ratio of the transmission 60, one modified procedure of braking control may fix the regeneration rate 'k' to the value k1 even at the Hi gear position having the lower speed change ratio during braking of the hybrid vehicle 20. In expectation of the change of the speed change state in the transmission 60, the modified procedure may change the setting of the regeneration rate 'k' to the smaller value k2 than the value k1.

The primary elements in the embodiment are mapped to the primary constituents in the claims of the invention as described below. The front propeller shaft 35 linked with the front wheels 39a and 39b via the front differential gear 37 and the rear propeller shaft 36 linked with the rear wheels 39c and 39d via the rear differential gear 38 in the structure of the embodiment are equivalent to the 'first shaft' and the 'second shaft' of the invention. The engine 22 outputting power to the ring gear shaft 32 or the driveshaft corresponds to the 'internal combustion engine' of the invention. The transfer 34 having the ability of transmitting the power output to the ring gear shaft 32 in the distributive manner to the front propeller shaft 35 and the rear propeller shaft 36 corresponds to the 'power distribution transfer structure' of the invention. The motor MG2 outputting at least the regenerative braking force to the ring gear shaft 32 as the output shaft of the motor MG2 corresponds to the 'motor' of the invention. The battery 50 transmitting electric power to and from the motor MG2 is equivalent to the 'accumulator unit' of the invention. The transmission 60 enabling transmission of the power between the rotating shaft 33 of the motor MG2 and the ring gear shaft 32 with a change of the speed change ratio is equivalent to the 'speed change transmission structure' of the invention. The brake unit 90 having the ability of independently applying the braking forces to the front wheels 39a and 39b and to the rear wheels 39c and 39d irrespective of the driver's braking request operation is equivalent to the 'braking mechanism' of the invention. The hybrid ECU 70 executing the braking control routine of FIGS. 3 and 4 corresponds to the 'braking force demand setting module' and the 'braking fraction setting module' of the invention. The hybrid ECU 70 executing the braking control routine of FIGS. 3 and 4, in combination with the motor ECU 40 and the brake ECU 95, corresponds to the 'braking controller' of the invention. The combination of the motor MG1 and the power distribution integration mechanism 30 is equivalent to the 'electric power mechanical power input output assembly' of the invention. The motor MG1 and the power distribution integration mechanism 30 are respectively equivalent to the 'motor for power generation' and the 'three shaft-type power input output structure' of the invention.

The 'internal combustion engine' is not restricted to the engine 22 that receives a supply of hydrocarbon fuel, such as gasoline or light oil, to output power, but may be any type of engine, for example, a hydrogen engine. The 'power distribution transfer structure' is not restricted to the transfer 34 including the center differential of the planetary gear system and the limited slip differential, but may be any structure that enables transfer of the power output to a preset driveshaft in a distributive manner to two different shafts. The 'motor' is not restricted to the motor MG2 outputting at least the regenerative braking force to the ring gear shaft 32 or the driveshaft via the 'speed change transmission structure' like the transmission 60, but may be a motor of any structure that enables output of at least the regenerative braking force via the 'speed change transmission structure' to either the first shaft like the front propeller shaft 35 or the second shaft like the rear propeller shaft 36. The 'motor' is not restricted to the synchronous motor generator like the motor MG2, but may be any type of motor, for example, an induction motor. The 'accumulator unit' is not restricted to the secondary battery like the battery 50, but may be any type of an accumulator that enables transmission of electric power to and from the motor, for example, a capacitor. The 'speed change transmission structure' is not restricted to the transmission 60 having the two different speeds, the Lo gear position and the Hi gear position, but may be a transmission of any structure that enables transmission of power between the rotating shaft of the motor and the output shaft of the motor with a change of the speed change ratio, for example, a step transmission with three or more different speeds. The 'braking mechanism' is not restricted to the brake unit 90 enabling independent application of the braking forces to the respective wheels, but may be any braking structure that enables independent application of braking forces to the front wheels and the rear wheels irrespective of the driver's braking request operation. The 'braking force demand setting module' is not restricted to setting of the braking torque demand Tr* based on the brake pedal position BP and the other relevant factors but may be any setting of a braking force demand required by the driver's braking request operation, for example, setting of the braking torque demand Tr* based on a master cylinder pressure. The 'braking controller' is not restricted to the combination of the hybrid ECU 70, the motor ECU 40, and the brake ECU 95, but may be a single electronic control unit or any other single controller or combination of controllers that controls the 'motor' to output a regenerative braking force based on a preset braking force demand and a preset fraction of regenerative braking force while controlling the 'braking mechanism' to enable the braking force based on the preset braking force demand and the regenerative braking force by the 'motor' to be applied in a distributive manner at a predetermined front-rear distribution ratio to the front wheels and the rear wheels. The 'electric power mechanical power input output assembly' is not restricted to the combination of the motor MG1 and the power distribution integration mechanism 30, but may be any other structure, for example, a pair-rotor motor. The 'power output apparatus' is not restrictively mounted on the 'vehicle' like the hybrid vehicle 20 but may be mounted on any of various automobiles and other vehicles as well as other moving bodies, such as boats and ships and aircraft, or may be built in any of stationary equipment like construction machinery. The above mapping of the primary elements in the embodiment to the primary constituents in the claims of the invention is not restrictive in any sense but is only illustrative for concretely describing the mode of carrying out the invention. Namely the embodiment discussed above is to be considered in all aspects as illustrative and not restrictive. The scope and spirit of the present invention are indicated by the appended claims, rather than by the foregoing description.

The embodiment and its modified examples discussed above are to be considered in all aspects as illustrative and not restrictive. There may be many other modifications, changes, and alterations without departing from the scope or spirit of the main characteristics of the present invention.

The disclosure of Japanese Patent Application No. 2007-28349 filed Feb. 7, 2007 including specification, drawings and claims is incorporated herein by reference in its entirety.

What is claimed is:

1. A vehicle that is driven with powers respectively output to front wheels and rear wheels, the vehicle comprising:
a first shaft that is linked with the front wheels;
a second shaft that is linked with the rear wheels;
an internal combustion engine that outputs power to a preset driveshaft;
a power distribution transfer structure that transfers power output to the driveshaft in a distributive manner to the first shaft and to the second shaft at a front-rear distribution ratio that is a constant value;
a motor that outputs at least a regenerative braking force to the driveshaft;
an accumulator unit that transmits electric power to and from the motor;
a speed change transmission structure that enables transmission of power between a rotating shaft of the motor and the driveshaft with a change of a speed change ratio;
a braking mechanism that enables independent application of a braking force to the front wheels and to the rear wheels;
a braking force demand setting module that sets a braking force demand required by a driver's braking request operation;
a braking fraction setting module that sets a fraction of the regenerative braking force by the motor and a fraction of the braking force by the braking mechanism relative to the set braking force demand according to a setting of the speed change ratio in the speed change transmission structure, in response to the driver's braking request operation, the braking fraction setting module gradually decreasing the fraction of the regenerative braking force relative to the set braking force demand before a start of the change of the speed change ratio in the speed change transmission structure, the braking fraction setting module setting the fraction of the regenerative braking force relative to the set braking force demand to zero during the change of the speed change ratio in the speed change transmission structure, and the braking fraction setting module gradually increasing the fraction of the regenerative braking force relative to the set braking force demand after the change of the speed change ratio in the speed change transmission structure; and
a braking controller that controls the motor to output the regenerative braking force based on the set braking force demand and the set fraction of the regenerative braking force, while controlling the braking mechanism to enable the braking force based on the set braking force demand and the regenerative braking force by the motor to be applied in a distributive manner at the constant front-rear distribution ratio to the front wheels and to the rear wheels.

2. The vehicle in accordance with claim 1, wherein the braking fraction setting module sets the fraction of the regenerative braking force by the motor and the fraction of the braking force by the braking mechanism to attain a gradual decrease of the regenerative braking force by the motor, simultaneously with a gradual increase of the braking force by the braking mechanism in expectation of a change of the speed change ratio in the speed change transmission structure.

3. The vehicle in accordance with claim 1, wherein the braking fraction setting module sets a smaller value to the fraction of the regenerative braking force relative to the set braking force demand at a lower speed change ratio in the speed change transmission structure.

4. The vehicle in accordance with claim 1, the vehicle further including an electric power mechanical power input output assembly that is connected to the driveshaft and a shaft of the internal combustion engine to enable transmission of at least part of the output power of the internal combustion engine to the driveshaft and transmission of electric power to and from the accumulator unit through input and output of electric power and mechanical power.

5. The vehicle in accordance with claim 4, wherein the electric power mechanical power input output assembly has: a motor for power generation that enables input and output of power; and a three shaft-type power input output structure that is linked to three shafts, the driveshaft, the shaft of the internal combustion engine, and a rotating shaft of the motor for power generation, and inputs and outputs power from and to a residual one shaft based on powers input from and output to any two shafts among the three shafts.

6. A control method of a vehicle, the vehicle being equipped with a first shaft that is linked with front wheels; a second shaft that is linked with rear wheels; an internal combustion engine that outputs power to a preset driveshaft; a power distribution transfer structure that transfers power output to the driveshaft in a distributive manner to the first shaft and to the second shaft at a front-rear distribution ratio that is a constant value; a motor that outputs at least a regenerative braking force to the driveshaft; an accumulator unit that transmits electric power to and from the motor; a speed change transmission structure that enables transmission of power between a rotating shaft of the motor and the driveshaft with a change of a speed change ratio; and a braking mechanism that enables independent application of a braking force to the front wheels and to the rear wheels, the control method of the vehicle comprising:
(a) setting a braking force demand required by a driver's braking request operation;
(b) setting a fraction of the regenerative braking force by the motor and a fraction of the braking force by the braking mechanism relative to the braking force demand set in the step (a) according to a setting of the speed change ratio in the speed change transmission structure, the step (b) gradually decreasing the fraction of the regenerative braking force relative to the set braking force demand before a start of the change of the speed change ratio in the speed change transmission structure, the step (b) setting the fraction of the regenerative braking force relative to the set braking force demand to zero during the change of the speed change ratio in the speed change transmission structure, and the step (b) gradually increasing the fraction of the regenerative braking force relative to the set braking force demand after the change of the speed change ratio in the speed change transmission structure; and (c) controlling the motor to output the regenerative braking force based on the braking force demand set in the step (a) and the fraction of the regenerative braking force set in the step (b), while controlling the braking mechanism to enable the braking force based on the braking force demand set in the step (a) and the regenerative braking force by the motor to be applied in a distributive manner at the constant front-rear distribution ratio to the front wheels and to the rear wheels.

7. The control method of the vehicle in accordance with claim 6, wherein the step (b) sets the fraction of the regenerative braking force by the motor and the fraction of the braking force by the braking mechanism to attain a gradual decrease of the regenerative braking force by the motor, simultaneously with a gradual increase of the braking force by the braking mechanism in expectation of a change of the speed change ratio in the speed change transmission structure.

8. The control method of the vehicle in accordance with claim 6, wherein the step (b) sets a smaller value to the fraction of the regenerative braking force relative to the set braking force demand at a lower speed change ratio in the speed change transmission structure.

9. A power output apparatus mounted on a vehicle, which is equipped with a braking mechanism that enables independent application of a braking force to front wheels and to rear wheels, the power output apparatus comprising:
a first shaft that is linked with the front wheels;
a second shaft that is linked with the rear wheels;
an internal combustion engine that outputs power to a preset driveshaft;
a power distribution transfer structure that transfers power output to the driveshaft in a distributive manner to the first shaft and to the second shaft at a front-rear distribution ratio that is a constant value;
a motor that outputs at least a regenerative braking force to the driveshaft;
an accumulator unit that transmits electric power to and from the motor;
a speed change transmission structure that enables transmission of power between a rotating shaft of the motor and the driveshaft with a change of a speed change ratio;
a braking force demand setting module that sets a braking force demand required by a driver's braking request operation;
a braking fraction setting module that sets a fraction of the regenerative braking force by the motor and a fraction of the braking force by the braking mechanism relative to the set braking force demand according to a setting of the speed change ratio in the speed change transmission structure, in response to the driver's braking request operation, the braking fraction setting module gradually decreasing the fraction of the regenerative braking force relative to the set braking force demand before a start of the change of the speed change ratio in the speed change transmission structure, the braking fraction setting module setting the fraction of the regenerative braking force relative to the set braking force demand to zero during the change of the speed change ratio in the speed change transmission structure, and the braking fraction setting module gradually increasing the fraction of the regenerative braking force relative to the set braking force demand after the change of the speed change ratio in the speed change transmission structure; and a braking controller that controls the motor to output the regenerative braking force based on the set braking force demand and the set fraction of the regenerative braking force, while controlling the braking mechanism to enable the braking force based on the set braking force demand and the regenerative braking force by the motor to be applied in a distributive manner at the constant front-rear distribution ratio to the front wheels and to the rear wheels.

10. A control method of a power output apparatus, the power output apparatus including: a first shaft; a second shaft; an internal combustion engine that outputs power to a preset driveshaft; a power distribution transfer structure that transfers power output to the driveshaft in a distributive manner to the first shaft and to the second shaft at a front-rear distribution ratio that is a constant value; a motor that outputs at least a regenerative braking force to the driveshaft; an accumulator unit that transmits electric power to and from the motor; and a speed change transmission structure that enables transmission of power between a rotating shaft of the motor and the driveshaft with a change of a speed change ratio, where the power output apparatus is mounted on a vehicle, which is equipped with a braking mechanism that enables independent application of a braking force to front wheels linked with the first shaft and to rear wheels linked with the second shaft, the control method of the power output apparatus comprising:

(a) setting a braking force demand required by a driver's braking request operation;

(b) setting a fraction of the regenerative braking force by the motor and a fraction of the braking force by the braking mechanism relative to the braking force demand set in the step (a) according to a setting of the speed change ratio in the speed change transmission structure, the step (b) gradually decreasing the fraction of the regenerative braking force relative to the set braking force demand before a start of the change of the speed change ratio in the speed change transmission structure, the step (b) setting the fraction of the regenerative braking force relative to the set braking force demand to zero during the change of the speed change ratio in the speed change transmission structure, and the step (b) gradually increasing the fraction of the regenerative braking force relative to the set braking force demand after the change of the speed change ratio in the speed change transmission structure; and (c) controlling the motor to output the regenerative braking force based on the braking force demand set in the step (a) and the fraction of the regenerative braking force set in the step (b), while controlling the braking mechanism to enable the braking force based on the braking force demand set in the step (a) and the regenerative braking force by the motor to be applied in a distributive manner at the constant front-rear distribution ratio to the front wheels and to the rear wheels.

11. A driving system that is mounted on a vehicle, which is equipped with an internal combustion engine, an accumulator unit, and a braking mechanism that enables independent application of a braking force to front wheels and to rear wheels, the driving system comprising:
- a driveshaft that is connected to the internal combustion engine;
- a first shaft that is linked with the front wheels;
- a second shaft that is linked with the rear wheels;
- a power distribution transfer structure that transfers power output to the driveshaft in a distributive manner to the first shaft and to the second shaft at a front-rear distribution ratio that is a constant value;
- a motor that enables transmission of electric power to and from the accumulator unit and outputs at least a regenerative braking force to the driveshaft;
- a speed change transmission structure that enables transmission of power between a rotating shaft of the motor and the driveshaft with a change of a speed change ratio;
- a braking force demand setting module that sets a braking force demand required by a driver's braking request operation;
- a braking fraction setting module that sets a fraction of the regenerative braking force by the motor and a fraction of the braking force by the braking mechanism relative to the set braking force demand according to a setting of the speed change ratio in the speed change transmission structure, in response to the driver's braking request operation, the braking fraction setting module gradually decreasing the fraction of the regenerative braking force relative to the set braking force demand before a start of the change of the speed change ratio in the speed change transmission structure, the braking fraction setting module setting the fraction of the regenerative braking force relative to the set braking force demand to zero during the change of the speed change ratio in the speed change transmission structure, and the braking fraction setting module gradually increasing the fraction of the regenerative braking force relative to the set braking force demand after the change of the speed change ratio in the speed change transmission structure; and
- a braking controller that controls the motor to output the regenerative braking force based on the set braking force demand and the set fraction of the regenerative braking force, while controlling the braking mechanism to enable the braking force based on the set braking force demand and the regenerative braking force by the motor to be applied in a distributive manner at the constant front-rear distribution ratio to the front wheels and to the rear wheels.

12. A control method of a driving system mounted on a vehicle, which is equipped with an internal combustion engine, an accumulator unit, and a braking mechanism that enables independent application of a braking force to front wheels and to rear wheels, the driving system including:
- a driveshaft that is connected to the internal combustion engine;
- a first shaft that is linked with the front wheels;
- a second shaft that is linked with the rear wheels;
- a power distribution transfer structure that transfers power output to the driveshaft in a distributive manner to the first shaft and to the second shaft at a front-rear distribution ratio that is a constant value;
- a motor that enables transmission of electric power to and from the accumulator unit and outputs at least a regenerative braking force to the driveshaft; and
- a speed change transmission structure that enables transmission of power between a rotating shaft of the motor and the driveshaft with a change of a speed change ratio, the control method of the driving system comprising:
(a) setting a braking force demand required by a driver's braking request operation;
(b) setting a fraction of the regenerative braking force by the motor and a fraction of the braking force by the braking mechanism relative to the braking force demand set in the step (a) according to a setting of the speed change ratio in the speed change transmission structure, the braking fraction setting module gradually decreasing the fraction of the regenerative braking force relative to the set braking force demand before a start of the change of the speed change ratio in the speed change transmission structure, the braking fraction setting module setting the fraction of the regenerative braking force relative to the set braking force demand to zero during the change of the speed change ratio in the speed change transmission structure, and the braking fraction setting module gradually increasing the fraction of the regenerative braking force relative to the set braking force demand after the change of the speed change ratio in the speed change transmission structure; and
(c) controlling the motor to output the regenerative braking force based on the braking force demand set in the step (a) and the fraction of the regenerative braking force set in the step (b), while controlling the braking mechanism to enable the braking force based on the braking force demand set in the step (a) and the regenerative braking force by the motor to be applied in a distributive manner at the constant front-rear distribution ratio to the front wheels and to the rear wheels.

* * * * *